J. R. SPENCER.
Animal-Trap.
No. 212,999. Patented Mar. 4, 1879.
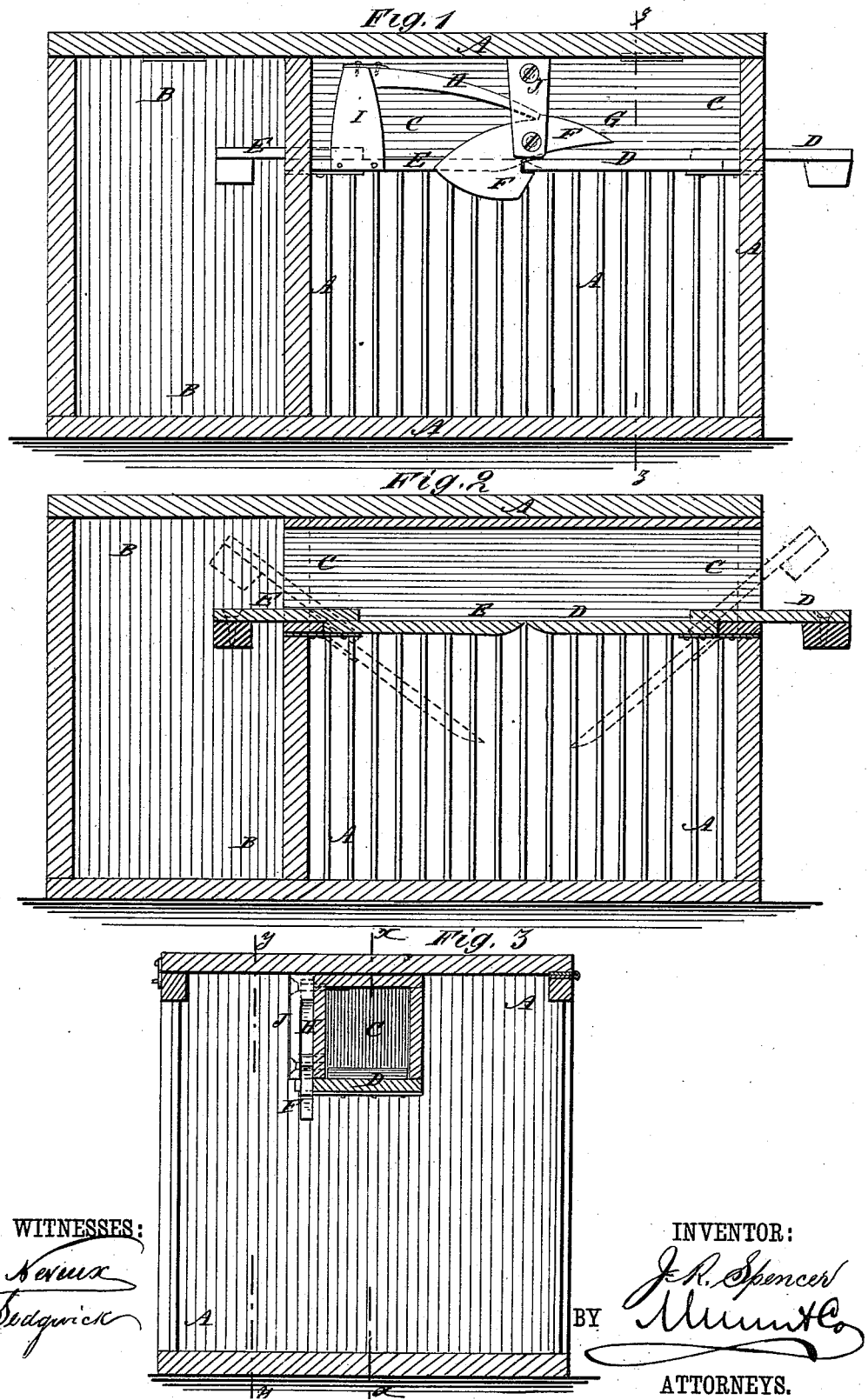

UNITED STATES PATENT OFFICE.

JONATHAN R. SPENCER, OF AVILLA, MISSOURI.

IMPROVEMENT IN ANIMAL-TRAPS.

Specification forming part of Letters Patent No. 212,999, dated March 4, 1879; application filed December 18, 1878.

*To all whom it may concern:*

Be it known that I, JONATHAN R. SPENCER, of Avilla, in the county of Jasper and State of Missouri, have invented a new and useful Improvement in Animal-Traps, of which the following is a specification:

Figure 1 is a vertical longitudinal section of my improved trap, taken through the line $x\,x$, Fig. 3. Fig. 2 is a vertical longitudinal section of the same, taken through the line $y\,y$, Fig. 3. Fig. 3 is a vertical cross-section of the same, taken through the line $z\,z$, Fig. 1.

Similar letters of reference indicate corresponding parts.

The object of this invention is to furnish an improved trap for catching rats, mice, prairie-chickens, grouse, and other animals and birds, which shall be simple in construction and convenient in use, being so constructed as to set itself after it is sprung, so as to catch an unlimited number of animals in succession.

The invention consists in improving that class of traps in which are two pivoted platforms whose free ends meet and are held by some device, so that the platform on which the animal first steps will remain firm and unyielding until the weight comes upon the other, by notching the top of a suspended trigger and providing a stop and pawl, as hereinafter described.

A B are two boxes or compartments, which may be made with close, transparent, or lattice-work sides. C is a box, made with open ends, and of such a length as to extend entirely through the box A. The box C is made of such a size that the animal or bird trapped for may pass through it easily, and its ends are secured in holes in the upper part of the outer end of the box A, and of the partition that separates the two boxes A B.

The bottom of the box C is made in two parts, D E, the inner ends of which meet at the center of the said box C, and their outer ends project a little beyond the ends of the said box C. The parts D E of the bottom of the box C are pivoted or hinged to and between the sides of the said box C, or to blocks attached to said sides, near its ends, and their outer said are weighted sufficiently to raise the said parts D E into and hold them in a horizontal position.

To the side of the middle part of the box C is pivoted a trigger or catch, F, which has a notch formed in its edge to receive the corner of the inner end of the outer part, D, of the bottom of the box C, and support the said part in a horizontal position.

The lower end of the catch F is made the heavier, so that its own weight will hold it in position to catch upon and hold the end of the part D when raised into place.

The downward movement of the heavier end of the catch F is limited by a pin, G, attached to the side of the box C above the lighter end of the said catch F.

In the upper edge of the lighter end of the catch F is formed a notch to receive the engaging end of the pawl H, the other end of which is hinged, by a piece of leather or other suitable hinge, to the upper end of an arm, I, attached to the side edge of the other part, E, of the bottom of the box C.

The pawl H is held in line with the catch F by a keeper, J, attached to the pivot of the said catch F and to the side of the box C.

With this construction, the animal enters the box C upon the outer part D, of its bottom, which part is held firm and steady by the catch F. When the animal steps upon the inner part, E, of the bottom of the box C, his weight causes the pawl H to press against the shoulder of the notch in the catch F, and withdraw the said catch from the end of the part D, allowing both parts D E of the said bottom to tilt, and depositing the animal in the box A suddenly, and without giving him a chance to alarm his fellows, and without leaving any sign of danger. As the animal falls into the box A, the parts D E swing back into their former positions and the trap is set for another animal.

In using the trap, the catch F is secured in place by a pin or other suitable means, so as to hold both parts D E of the bottom of the box C firm and steady. The box B is then filled with bait, and the animals are allowed to have free access to it through the box C, until they become accustomed to it, and come to consider it a safe and convenient feeding-place. The catch F is then released, and the animals are caught as they enter the box C.

I am aware that it is not new to support two platforms upon pivots which have each an end arm so connected with a side lever as to prevent the first platform upon which the animal treads from sinking until the weight of the animal is thrown on the second, when both sink together; but

What I claim is—

In traps having two pivoted platforms supported by a trigger, the combination of the suspended latch F, notched on the upper edge, the stop G, and the pawl H, substantially as and for the purpose specified.

JONATHAN R. SPENCER.

Witnesses:
R. H. SPENCER,
J. F. MITCHELL.